US012463335B2

(12) United States Patent
Jung et al.

(10) Patent No.: US 12,463,335 B2
(45) Date of Patent: Nov. 4, 2025

(54) SHIELD CAN HAVING ANTENNA FUNCTION

(71) Applicant: AMOTECH CO., LTD., Incheon (KR)

(72) Inventors: Hongdae Jung, Incheon (KR); Yunsik Seo, Incheon (KR); Hyungil Baek, Incheon (KR); Kyunghyun Ryu, Incheon (KR); Jaemin Kim, Incheon (KR); Jiwoong Jeong, Incheon (KR); Jungryul Kim, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 134 days.

(21) Appl. No.: 18/287,014

(22) PCT Filed: Mar. 23, 2022

(86) PCT No.: PCT/KR2022/004058
§ 371 (c)(1),
(2) Date: Oct. 15, 2023

(87) PCT Pub. No.: WO2022/220429
PCT Pub. Date: Oct. 20, 2022

(65) Prior Publication Data

US 2024/0195057 A1 Jun. 13, 2024

(30) Foreign Application Priority Data

Apr. 16, 2021 (KR) ........................ 10-2021-0049699

(51) Int. Cl.
*H01Q 1/38* (2006.01)
*H01Q 1/52* (2006.01)

(52) U.S. Cl.
CPC ............... *H01Q 1/526* (2013.01); *H01Q 1/38* (2013.01)

(58) Field of Classification Search
CPC ............ H01Q 1/38; H01Q 1/52; H01Q 1/243; H01Q 1/526; H01Q 1/084; H01Q 9/0407; H01Q 9/0414; H01Q 9/0464; H01Q 21/28
See application file for complete search history.

(56) References Cited

U.S. PATENT DOCUMENTS 6,040,806 A * 3/2000 Kushihi ................. H01Q 21/24 343/702
6,181,281 B1 * 1/2001 Desclos ............... H01Q 9/0407 343/700 MS (Continued)

FOREIGN PATENT DOCUMENTS

KR 10-2009-0033373 A 4/2009
KR 10-1077452 B1 10/2011
KR 10-2013234 B1 8/2019

OTHER PUBLICATIONS

KR Office Action dated May 30, 2023 as received in Application No. 10-2021-0049699.

*Primary Examiner* — Tung X Le
(74) *Attorney, Agent, or Firm* — Maschoff Brennan

(57) ABSTRACT

Disclosed is a shield can for operating as an antenna while blocking electromagnetic waves by defining a radiation region resonating in one or more frequency bands according to the formation of slots. The disclosed shield can arranged on a printed circuit board to cover electronic components mounted on the printed circuit board comprises: a first slit formed in the shield can to divide the shield can into a first inner region and a first outer region spaced from the first inner region; a shielding region, which is the first outer region divided by means of the first slit; and a first radiation region which is the first inner region divided by means of the first slit.

6 Claims, 6 Drawing Sheets

100

(56) References Cited

U.S. PATENT DOCUMENTS

| | | | | |
|---|---|---|---|---|
| 6,867,746 | B2 | 3/2005 | Mendolia et al. | |
| 7,298,339 | B1 | 11/2007 | Ollikainen | |
| 8,305,285 | B2 | 11/2012 | Lee | |
| 8,604,992 | B2 * | 12/2013 | Kobayashi | G06K 7/10336 343/788 |
| 2006/0077113 | A1 * | 4/2006 | Yuanzhu | H01Q 13/10 343/770 |
| 2008/0143608 | A1 | 6/2008 | Watanabe et al. | |
| 2011/0043426 | A1 * | 2/2011 | Lee | H01Q 1/526 343/848 |
| 2015/0288067 | A1 * | 10/2015 | Kwon | H01Q 9/40 320/108 |
| 2016/0043463 | A1 * | 2/2016 | Nakagawa | H01Q 1/243 343/700 MS |
| 2019/0123446 | A1 | 4/2019 | Thornton | |
| 2021/0356550 | A1 * | 11/2021 | Lee | H01Q 1/526 |

* cited by examiner

[FIG. 1]
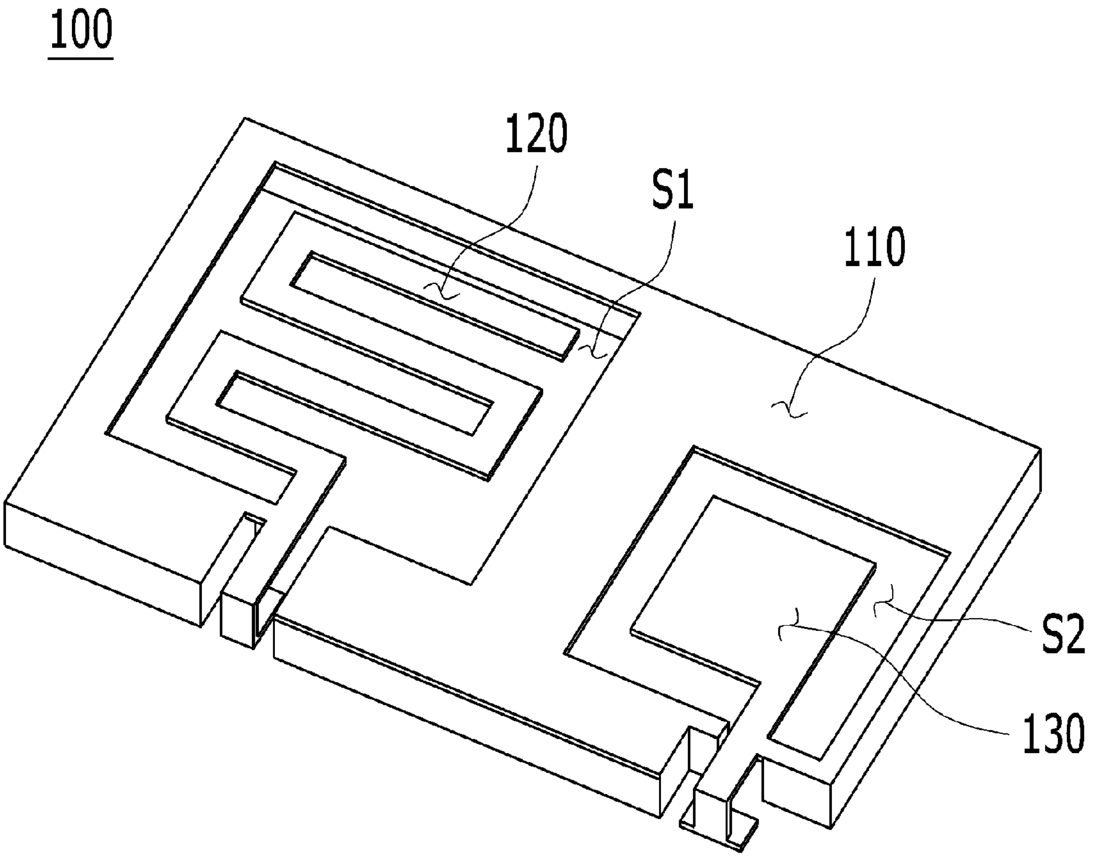

[FIG. 2]
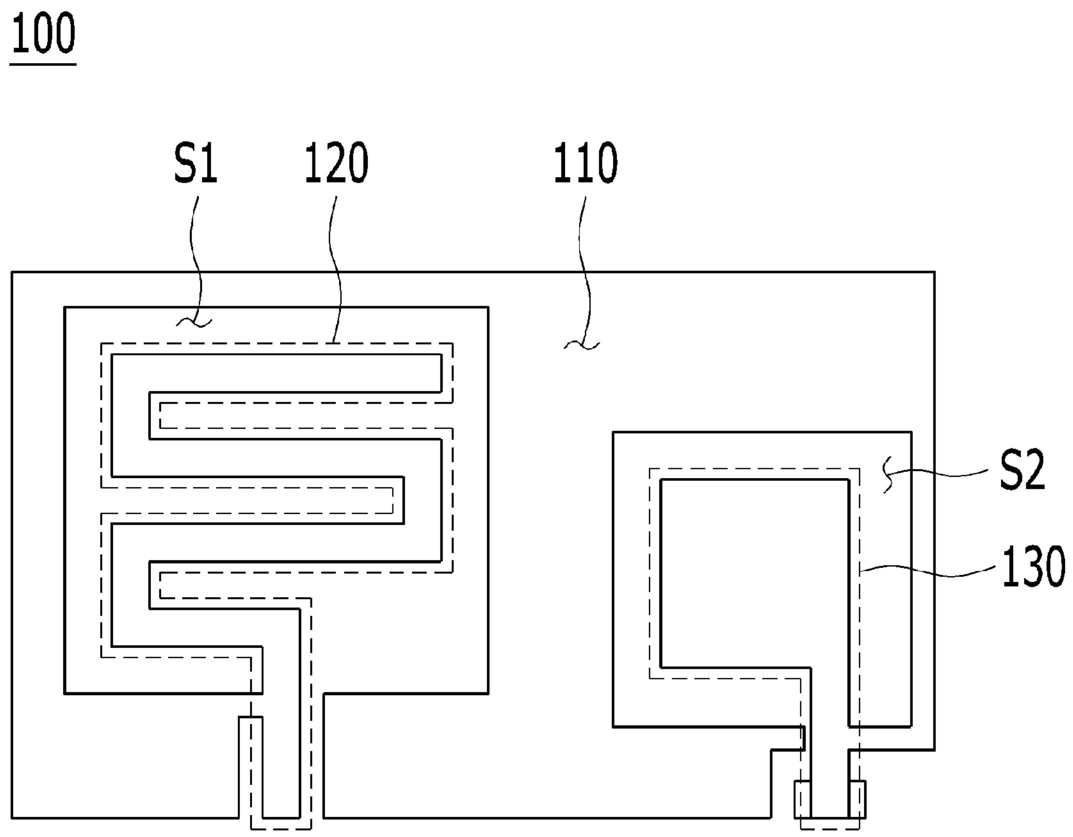

[FIG. 3]
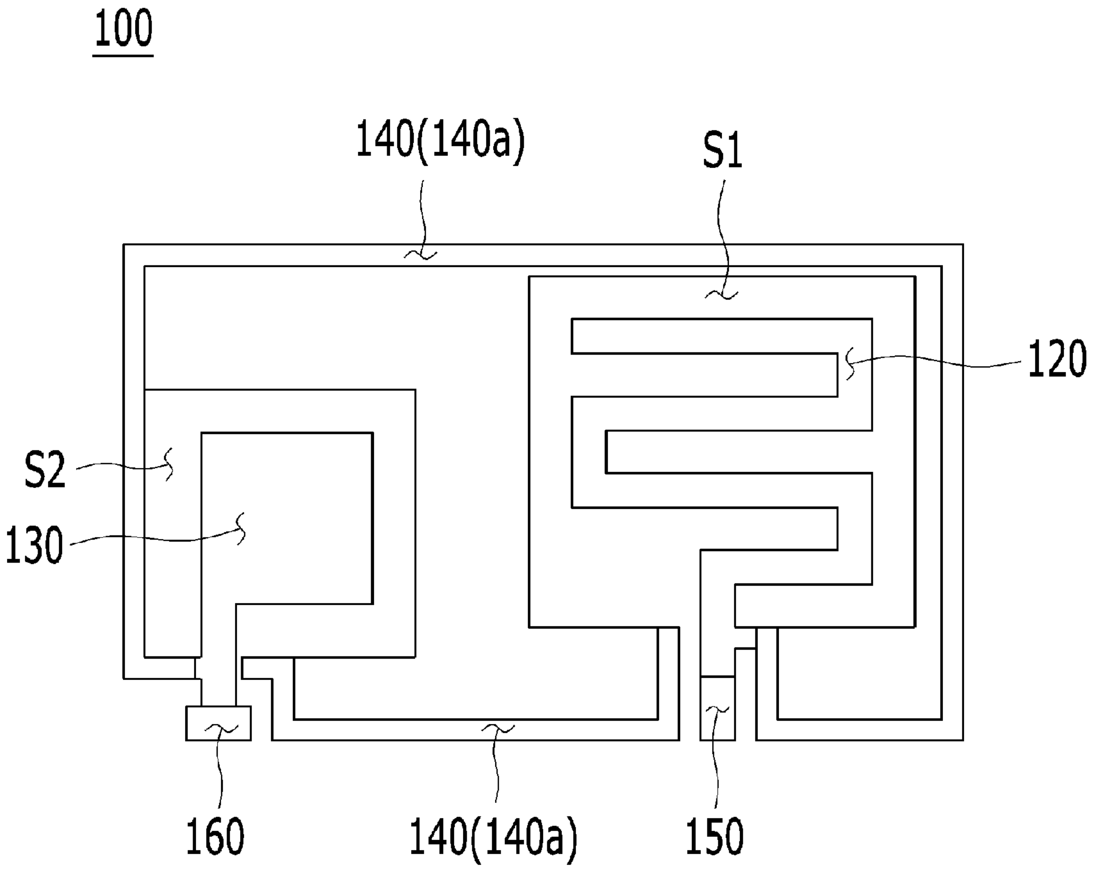

[FIG. 4]
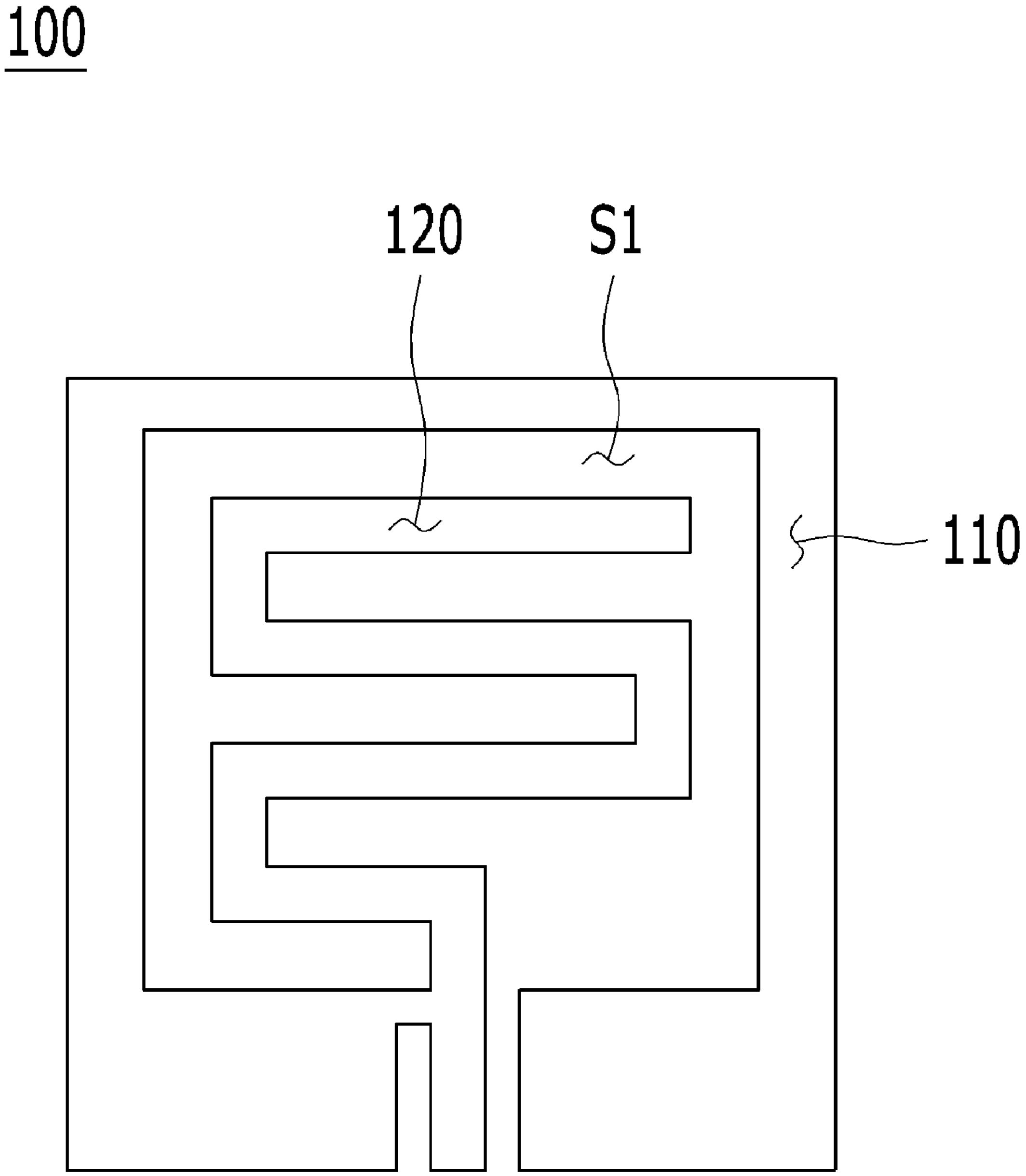

[FIG. 5]
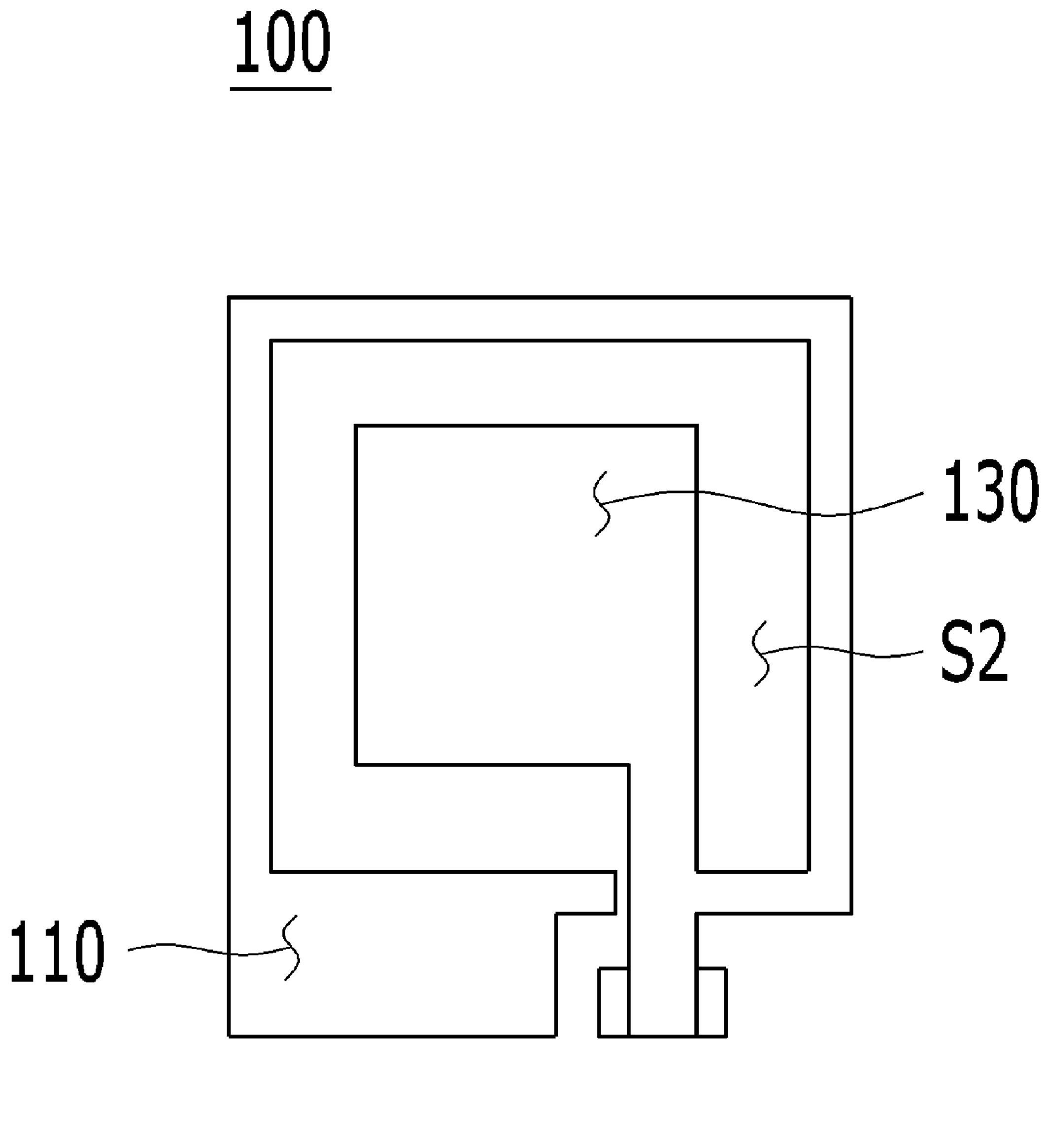

[FIG. 6]
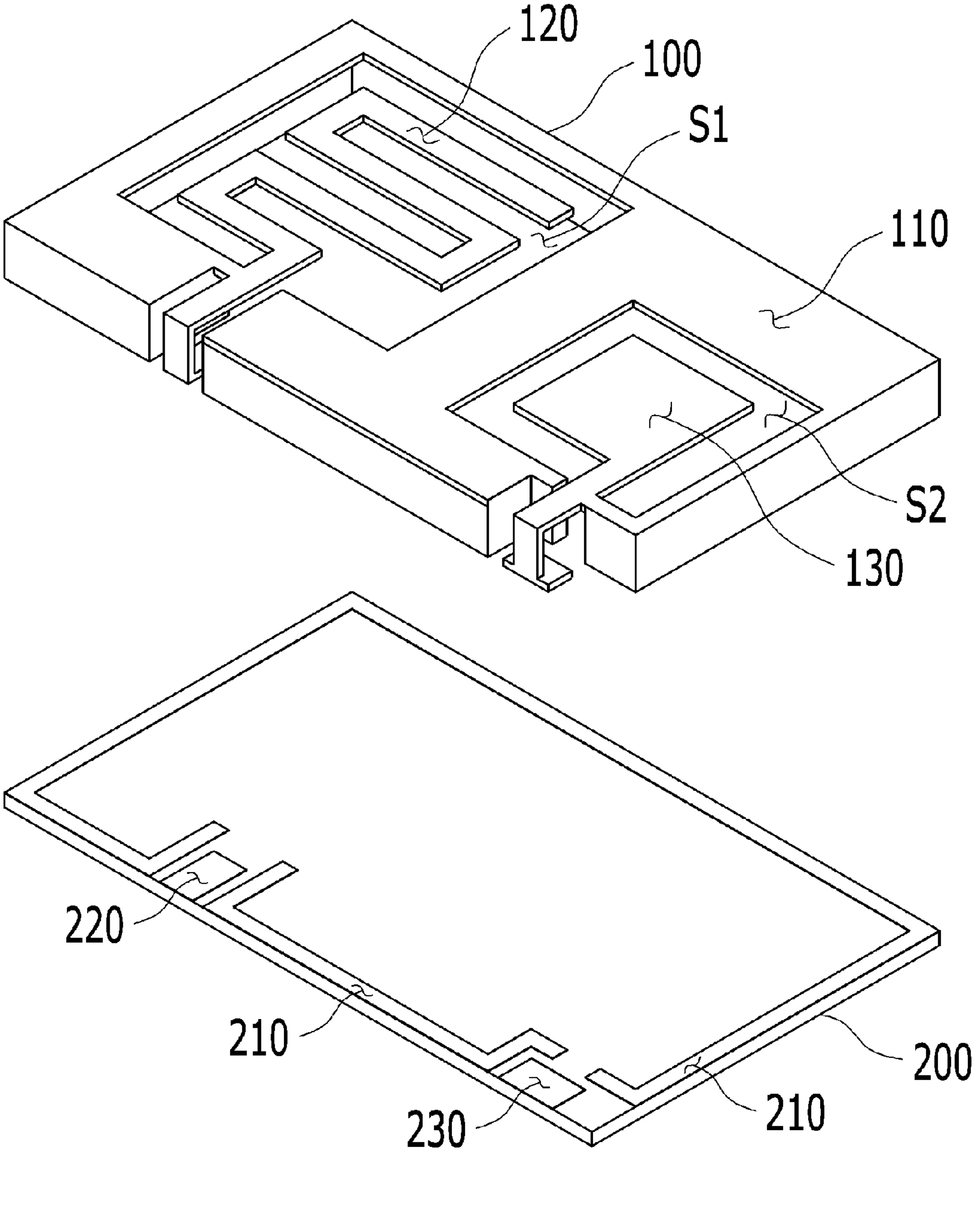

SHIELD CAN HAVING ANTENNA FUNCTION

TECHNICAL FIELD

The present disclosure relates to a shield can mounted on an electronic device and for shielding electromagnetic waves to block noises.

BACKGROUND ART

Recently, as electronic devices have become more complex and have advanced specifications, the number of antennas mounted (or installed) is increasing. For example, recent smartphones are equipped with an antenna for transmitting and receiving signals in mobile communication frequency bands, an antenna for short-range communication such as Bluetooth and near-field communication (NFC), a global positioning system (GPS) antenna and a ultra-wideband (UWB) antenna for transmitting and receiving position information, and the like.

However, as an electronic device is gradually becoming slimmer and smaller, there is a problem in that a space for mounting electronic components and antennas is insufficient, and due to a reduction of the mounting space, interference occurs between the electronic components and the antennas mounted on the electronic device, there degrading the performance of the antennas.

Therefore, a shield can for shielding electromagnetic waves is mounted on the electronic device, and there is a problem in that as the shield can is additionally disposed, the mounting space becomes more insufficient, and a layout structure and circuits of the electronic components become complicated.

SUMMARY OF INVENTION

Technical Problem

The present disclosure has been made in efforts to solve the problems and is directed to providing a shield can, which operates as an antenna while shielding electromagnetic waves by defining a radiation region resonating in one or more frequency bands according to the formation of slits.

Solution to Problem

In order to achieve the object, a shield can disposed on an upper surface of a printed circuit board and configured to cover electronic components mounted on the printed circuit board according to an embodiment of the present disclosure includes a first slit formed in the shield can and dividing the shield region into a first internal region and a first external region spaced apart from the first internal region, a shield region that is the first external region divided by the first slit, and a first radiation region that is the first internal region divided by the first slit.

The first radiation region and the shield region may be spaced by 1 mm or more from each other with the first slit interposed therebetween, and the first radiation region may have one of a meander line shape and a patch shape.

The shield can according to the embodiment of the present disclosure may further include a second slit spaced apart from the first slit, formed in the first external region, and dividing the first external region into a second internal region and a second external region spaced apart from the second internal region, and a second radiation region that is the second internal region divided by the second slit.

The shield region may be the second external region divided by the second slit among the first external region, and the second radiation region and the shield region may be spaced by 1 mm or more from each other with the second slit interposed therebetween.

The first radiation region may be formed in a meander line shape and resonates in a first frequency band, and the second radiation region may be formed in a patch shape and resonates in a second frequency band differing from the first frequency band.

The shield can according to an embodiment of the present disclosure includes a first power feeding region formed on a lower surface of the shield can and connected to the first radiation region, and a second power feeding region formed on the lower surface of the shield can and connected to the second radiation region.

Advantageous Effects of Invention

According to the present disclosure, the shield can may operate as the antenna by forming the slits (or the slots) and forming the metal radiation region.

In addition, since the shield can operates as the antenna and thus the separate antenna is not mounted on the electronic device, it is possible to minimize the mounting space for mounting the antenna and the shield can. Therefore, the electronic device for mounting the shield can according to the embodiment of the present disclosure can secure the mounting space and become slimmer and smaller compared to the electronic device in which the antenna and the conventional shield can are mounted.

In addition, since the shield can does not require the additional antenna, it is possible to reduce the manufacture cost of the electronic device.

BRIEF DESCRIPTION OF DRAWINGS

FIG. 1 is a perspective view for describing a shield can according to an embodiment of the present disclosure.

FIG. 2 is a top view for describing the shield can according to the embodiment of the present disclosure.

FIG. 3 is a bottom view for describing the shield can according to the embodiment of the present disclosure.

FIGS. 4 and 5 are views for describing a modified example of the shield can according to the embodiment of the present disclosure.

FIG. 6 is a view for describing a bonding structure of the shield can and a circuit board according to the embodiment of the present disclosure.

DESCRIPTION OF EMBODIMENTS

Hereinafter, the most preferred embodiment of the present disclosure will be described with reference to the accompanying drawings in order to describe the present disclosure in detail to the extent that those skilled in the art can easily carry out the technical spirit of the present disclosure. First, in adding reference numerals to components in each drawing, it should be noted that the same components have the same reference numerals as much as possible even when they are shown in different drawings. In addition, in describing embodiments of the present disclosure, when it is determined that the detailed description of related known configurations or functions may obscure the gist of the present disclosure, a detailed description thereof will be omitted.

Referring to FIG. 1, a shield can 100 according to an embodiment of the present disclosure is configured to cover electronic components mounted on a circuit board from the top of the circuit board. The shield can 100 is made of plate-shaped metal to shield electromagnetic waves. For example, the shield can 100 is formed in a rectangular parallelepiped shape having an open lower surface to accommodate the electronic components.

Slits (i.e., a first slit S1 and a second slit S2 or slots) for forming a portion of the shield can 100 as a radiation region is formed in the shield can 100. Radiation regions 120 and 130 in various shapes may be formed in the shield can 100 by the slits S1 and S2, and the radiation region in a meander line shape or a patch shape (plate shape) may be formed depending on a frequency band in which the radiation region resonates.

In this case, in FIG. 1, it is illustrated that a first radiation region 120 and a second radiation region 130 are formed in the shield can 100 in order to easily describe the embodiment of the present disclosure, but the present disclosure is not limited thereto, and only one radiation region may be formed, or three or more radiation regions may be formed.

Referring to FIG. 2, as the slits S1 and S2 (or the slots) are formed in the shield can 100, a shielding region 110, the first radiation region 120, and the second radiation region 130 may be formed in the shield can 100.

The shielding region 110 is a region disposed in outer circumferences of the slits S1 and S2 formed to form the radiation region. As the slits S1 and S2 are formed in an upper surface of the shield can 100, a first accommodation hole 112 in which the first radiation region 120 is accommodated is defined in the shielding region 110, and a second accommodation hole 114 in which the second radiation region 130 is accommodated is defined in the shielding region 110.

The first radiation region 120 is a region of the upper surface of the shield can 100, which operates as a radiator that resonates with a signal in a first frequency band. The first radiation region 120 is a region disposed in an inner circumference of the first slit S1 formed to form the radiation region. In this case, the first radiation region 120 is defined in a region positioned on the inner circumference of the first accommodation hole 112 defined in the shielding region 110.

The first radiation region 120 is formed in a meander line shape with a predetermined line width. In this case, for example, the first radiation region 120 operates as a radiator that is formed in the meander line shape with one or more bent portions and resonates with the signal in the first frequency band, and is formed in the meander line shape with seven bent portions and resonates with a signal in a Bluetooth low energy (BLE) frequency band. Here, since a line width of the first radiation region 120 may be variously changed depending on the electronic components to be accommodated, the resonant frequency band, or the like, the value is not limited.

Meanwhile, when the first radiation region 120 and the shielding region 110 are disposed adjacent to each other, signal interference occurs and the antenna performance of the first radiation region 120 is inevitably degraded. Therefore, the first radiation region 120 is disposed to be spaced by a set distance or more from the first accommodation hole 112. In other words, the first slit S1 positioned between the shielding region 110 and the first radiation region 120 is disposed to have a width that is larger than or equal to a set width. Here, the set distance and the set width are, for example, about 1 mm or more.

The second radiation region 130 is a region of the upper surface of the shield can 100, which operates as a radiator that resonates with a signal in a second frequency band. The second radiation region 130 is a region disposed in an inner circumference of the second slit S2 formed to form the radiation region. In this case, the second radiation region 130 is defined in an inner circumferential region of the second accommodation hole 114 defined in the shielding region 110.

The second radiation region 130 is formed in a patch shape (plate shape) with a predetermined line width. In this case, for example, the second radiation region 130 operates as a radiator that is formed in the patch line shape with a predetermined area and resonates with the signal in the second frequency band, and is formed in the patch shape with a quadrangular shape having a predetermined area and resonates with a signal in a ultra-wideband (UWB) frequency band. Here, since the area of the second radiation region 130 may be variously changed depending on the electronic components to be accommodated, the resonant frequency band, or the like, the value is not limited.

Meanwhile, when the second radiation region 130 and the shielding region 110 are disposed adjacent to each other, signal interference occurs and the antenna performance of the second radiation region 130 is inevitably degraded. Therefore, the second radiation region 130 is disposed to be spaced by a set distance or more from the second accommodation hole 114. In other words, the second slit S2 positioned between the shielding region 110 and the second radiation region 130 is disposed to have a width that is larger than or equal to a set width. Here, the set distance and the set width are, for example, about 1 mm or more.

Referring to FIG. 3, a bonding region 140, a first power feeding region 150, and a second power feeding region 160 are defined on a lower surface of the shield can 100.

The bonding region 140 is a region that is bonded to an attachment region disposed on the circuit board when the shield can 100 is mounted on the circuit board. The bonding region 140 is disposed along an edge of the lower surface of the shield can 100 and has a first bonding surface **140*a*** having a predetermined area.

The first power feeding region 150 is a region connected to a power feeding pad of the circuit board to supply power to the first radiation region 120. In this case, an end portion of the first radiation region 120 extends to a lower portion of the shield can 100 through a side surface of the shield can 100, and the first power feeding region 150 is connected to the end portion of the first radiation region 120. The first power feeding region 150 is connected to a first signal processing element (not illustrated) for processing the signal in the first frequency band through the power feeding pad of the circuit board. In this case, for example, the first power feeding region 150 is spaced by a set distance or more from the bonding region 140, and the set distance is about 1 mm or more.

The second power feeding region 160 is a region connected to the power feeding pad of the circuit board to supply power to the second radiation region 130. In this case, an end portion of the second radiation region 130 extends to a lower portion of the shield can 100 through the side surface of the shield can 100, and the second power feeding region 160 is connected to the end portion of the second radiation region 130. The second power feeding region 160 is connected to a second signal processing element (not illustrated) for processing the signal in the second frequency band through the power feeding pad of the circuit board. In this case, for example, the second power feeding region 160 is spaced by a set distance or more from the bonding region 140, and the set distance is about 1 mm or more.

Meanwhile, in FIGS. 1 to 3, it has been illustrated and described that the first radiation region 120 and the second radiation region 130 are defined in the shield can 100, but the present disclosure is not limited thereto, and only one radiation region among the first radiation region 120 and the second radiation regions 130 may be defined.

For example, referring to FIG. 4, only the first radiation region 120 formed in the meander line shape with the predetermined line width may be defined in the shield can 100. In this case, the first radiation region 120 is formed in the meander line shape in which the plurality of bent portions are formed and resonates with the signal in the first frequency band, and the line width, the area, and the like of the first radiation region 120 may be variously changed depending on the resonance frequency band (i.e., the first frequency band).

As another example, referring to FIG. 5, only the second radiation region 130 formed in the patch shape (plate shape) with the predetermined area may be defined in the shield can 100. In this case, the second radiation region 130 is formed in the patch shape having the predetermined area and resonates with the signal in the second frequency band, and the area, the shape, and the like of the second radiation region 130 may be variously changed depending on the resonance frequency band (i.e., the second frequency band).

Referring to FIG. 6, the shield can 100 according to the embodiment of the present disclosure is mounted on a circuit board 200 disposed inside the electronic device.

The circuit board 200 is disposed inside the electronic device, and electronic components are mounted on an upper surface of the circuit board on which the shield can 100 is mounted. In this case, a second bonding surface 210 in surface contact with the first bonding surface 140*a* of the shield can 100 and fixedly bonding the shield can 100 is formed on the upper surface of the circuit board 200.

The second bonding surface 210 is formed on the upper surface of the circuit board 200 through a surface mount device (SMD) process. In this case, the second bonding surface 210 is formed along an outer periphery of the upper surface of the circuit board 200 and formed in a shape corresponding to the shape of the first bonding surface 140*a* formed on the lower surface of the shield can 100.

A power feeding pad is formed on the upper surface of the circuit board 200 to supply power to the first radiation region 120 and the second radiation region 130 of the shield can 100. For example, a first power feeding pad 220 and a second power feeding pad are formed on the upper surface of the circuit board 200.

The first power feeding pad 220 is formed on the upper surface of the circuit board 200 through the SMD process. The first power feeding pad 220 is connected to a first signal processing element (not illustrated) for processing the signal in the first frequency band.

The first power feeding pad 220 is formed in a region of the upper surface of the circuit board 200, which is in surface contact with the first power feeding region 150 of the shield can 100 mounted on the upper surface of the circuit board 200. As the shield can 100 is mounted on the circuit board 200, the first power feeding pad 220 is in surface contact with the first power feeding region 150 of the shield can 100 and electrically connected to the first power feeding region 150. In this case, the first radiation region 120 of the shield can 100 is in surface contact with the first power feeding pad 220 to receive power and resonates in the first frequency band to transmit the signal in the first frequency band to the first signal processing element (not illustrated).

The second power feeding pad 230 is formed on the upper surface of the circuit board 200 through the SMD process. The second power feeding pad 230 is connected to a second signal processing element (not illustrated) for processing the signal in the second frequency band.

The second power feeding pad 230 is formed in a region of the upper surface of the circuit board 200, which is in surface contact with the second power feeding region 160 of the shield can 100 mounted on the upper surface of the circuit board 200. As the shield can 100 is mounted on the circuit board 200, the second power feeding pad 230 is in surface contact with the second power feeding region 160 of the shield can 100 and electrically connected to the second power feeding region 160. In this case, the second radiation region 130 of the shield can 100 is in surface contact with the second power feeding pad 230 to receive power and resonates in the second frequency band to transmit the signal in the second frequency band to the second signal processing element (not illustrated).

In this case, in FIG. 6, it has been illustrated and described that the shield can is in surface contact with and boned to the circuit board of the electronic device in order to easily describe the embodiment of the present disclosure, but the present disclosure is not limited thereto, and may be coupled by being fitted into a coupling member such as a C-clip or a connector formed on the circuit board. In addition, the shield can may be mounted on the circuit board using the conventional coupling method for mounting the shield can on the circuit board.

Although the preferred embodiments of the present disclosure have been described above, modifications can be made in various forms, and those skilled in the art can carry out various changes and modifications without departing from the claims of the present disclosure.

The invention claimed is:

1. A shield can disposed on an upper surface of a printed circuit board and configured to cover electronic components mounted on the printed circuit board, the shield can comprising:

- a first slit formed in the shield can and dividing the shield can into a first internal region and a first external region spaced apart from the first internal region;
- a shield region that is the first external region divided by the first slit;
- a first radiation region that is the first internal region divided by the first slit;
- a second slit spaced apart from the first slit, formed in the first external region, and dividing the first external region into a second internal region and a second external region spaced apart from the second internal region; and
- a second radiation region that is the second internal region divided by the second slit,
- wherein the first radiation region is formed in a meander line shape and resonates in a first frequency band, and
- the second radiation region is formed in a patch shape and resonates in a second frequency band differing from the first frequency band.

2. The shield can of claim 1, wherein the first radiation region and the shield region are spaced by 1 mm or more from each other with the first slit interposed therebetween.

3. The shield can of claim 1, wherein the first radiation region has one of a meander line shape and a patch shape.

4. The shield can of claim 1, wherein the shield region is the second external region divided by the second slit among the first external region.

5. The shield can of claim 1, wherein the second radiation region and the shield region are spaced by 1 mm or more from each other with the second slit interposed therebetween.

6. The shield can of claim 1, comprising: a first power feeding region formed on a lower surface of the shield can and connected to the first radiation region; and a second power feeding region formed on the lower surface of the shield can and connected to the second radiation region.

* * * * *